US011372246B2

(12) United States Patent
Leibovici et al.

(10) Patent No.: US 11,372,246 B2
(45) Date of Patent: Jun. 28, 2022

(54) NEAR-EYE DISPLAY SYSTEM HAVING OPTICAL COMBINER

(71) Applicant: Facebook Technologies, LLC, Menlo Park, CA (US)

(72) Inventors: Matthieu Charles Raoul Leibovici, Menlo Park, CA (US); Pasi Saarikko, Menlo Park, CA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 207 days.

(21) Appl. No.: 16/788,980

(22) Filed: Feb. 12, 2020

(65) Prior Publication Data
US 2020/0271936 A1    Aug. 27, 2020

Related U.S. Application Data

(60) Provisional application No. 62/809,506, filed on Feb. 22, 2019.

(51) Int. Cl.
*G02B 5/32*        (2006.01)
*G02B 27/01*       (2006.01)
(Continued)

(52) U.S. Cl.
CPC ....... G02B 27/0172 (2013.01); G02B 6/0016 (2013.01); G02B 6/0035 (2013.01);
(Continued)

(58) Field of Classification Search
CPC .......................... G02B 27/0172; G02B 6/0016; G02B 6/0035; G02B 6/0065; G02B 2027/0174;
(Continued)

(56) References Cited

U.S. PATENT DOCUMENTS 8,325,166 B2 * 12/2012 Akutsu .................. G02B 6/124
345/204
10,670,876 B2 * 6/2020 Popovich ............. G02B 6/0016
(Continued)

FOREIGN PATENT DOCUMENTS

CN          109239842 A       1/2019
EP            2733517 A1       5/2014

OTHER PUBLICATIONS

International Search Report and Written Opinion issued in PCT Application No. PCT/US2020/018543, dated Jun. 12, 2020 (14 pages).

*Primary Examiner* — Audrey Y Chang
(74) *Attorney, Agent, or Firm* — Millburn IP PLLC

(57) ABSTRACT

An optical waveguide is provided. The optical waveguide includes a base structure and a plurality of grating structures disposed at the base structure. The grating structures include a plurality of in-coupling grating structures configured to couple a plurality of lights into the optical waveguide. At least one of a grating period or a slant angle of a first in-coupling grating structure is different from at least one of a corresponding grating period or a corresponding slant angle of a second in-coupling grating structure. The grating structures also include a plurality of out-coupling grating structures configured to couple the lights out of the optical waveguide.

19 Claims, 8 Drawing Sheets

(51) Int. Cl.
*F21V 8/00* (2006.01)
*G03H 1/02* (2006.01)

(52) U.S. Cl.
CPC ......... *G02B 6/0065* (2013.01); *G03H 1/0244* (2013.01); *G03H 1/0248* (2013.01); *G02B 2027/0174* (2013.01); *G03H 2260/12* (2013.01)

(58) Field of Classification Search
CPC .. G02B 6/124; G02B 27/0103; G03H 1/0248; G03H 1/0244; G03H 2260/12; G03H 2223/16
USPC .................................................. 359/34, 569
See application file for complete search history.

(56) References Cited

U.S. PATENT DOCUMENTS

| | | | |
|---|---|---|---|
| 2006/0228073 A1* | 10/2006 | Mukawa | G02B 27/0103 385/31 |
| 2006/0291021 A1* | 12/2006 | Mukawa | G02B 6/0035 359/15 |
| 2007/0070504 A1* | 3/2007 | Akutsu | G02B 5/32 359/573 |
| 2017/0131545 A1 | 5/2017 | Wall et al. | |
| 2018/0284440 A1 | 10/2018 | Popovich et al. | |

\* cited by examiner

NEAR-EYE DISPLAY SYSTEM HAVING OPTICAL COMBINER

CROSS REFERENCE TO RELATED APPLICATION

This application claims the benefit of U.S. Provisional Patent Application No. 62/809,506, filed on Feb. 22, 2019, which is incorporated by reference in its entirety.

TECHNICAL FIELD

The present disclosure relates generally to optical systems and, more specifically, to a near-eye display system having an optical combiner.

BACKGROUND

Near-eye displays ("NED"), such as head-mounted displays implemented in virtual-reality ("VR") systems and/or augmented-reality ("AR") systems have design criteria such as compact, light weight, high resolution, large field of view ("FOV"), and small form factors. Near-eye displays include a display element that generates an image light that passes through one or more lenses before reaching eyes of a user. The one or more lenses can affect the ability of the NEDs to provide a comfortable visual experience to users. In AR systems, an AR combiner may be included to combine an image light of a virtual object and a light reflected by objects in a real world environment, such that the user may see through the combiner to view the real world environment while also viewing virtual objects superimposed on the real world environment view. In an AR combiner, a virtual two-dimensional image is provided from a single point and projected into a user's eye. The combiner may include diffractive optics (e.g., holographic grating, surface relief grating, etc.) to direct the image light into the eye of the user, rendering an impression to the user that the image comes from a far field.

SUMMARY

One aspect of the present disclosure provides an optical waveguide including a base structure and a plurality of grating structures disposed at the base structure. The plurality of grating structures include a plurality of in-coupling grating structures configured to couple a plurality of lights into the optical waveguide. At least one of a grating period or a slant angle of a first in-coupling grating structure is different from at least one of a corresponding grating period or a corresponding slant angle of a second in-coupling grating structure. The plurality of grating structures also include a plurality of out-coupling grating structures configured to couple the lights out of the optical waveguide.

Another aspect of the present disclosure provides an optical device. The optical device includes a display configured to generate a plurality of image lights, and an optical waveguide coupled with the display and configured to guide the image lights generated by the display to an eye-box of the optical device. The optical waveguide includes a base structure and a plurality of grating structures disposed at the base structure. The plurality of grating structures include a plurality of in-coupling grating structures configured to couple the image lights into the optical waveguide. At least one of a grating period or a slant angle of a first in-coupling grating structure is different from at least one of a corresponding grating period or a corresponding slant angle of a second in-coupling grating structure. The plurality of grating structures also include a plurality of out-coupling grating structures configured to couple the image lights out of the optical waveguide.

Other aspects of the present disclosure can be understood by those skilled in the art in light of the description, the claims, and the drawings of the present disclosure. The foregoing general description and the following detailed description are exemplary and explanatory only and are not restrictive of the claims.

BRIEF DESCRIPTION OF THE DRAWINGS

The following drawings are provided for illustrative purposes according to various disclosed embodiments and are not intended to limit the scope of the present disclosure. In the drawings.

DETAILED DESCRIPTION

Figure 1:
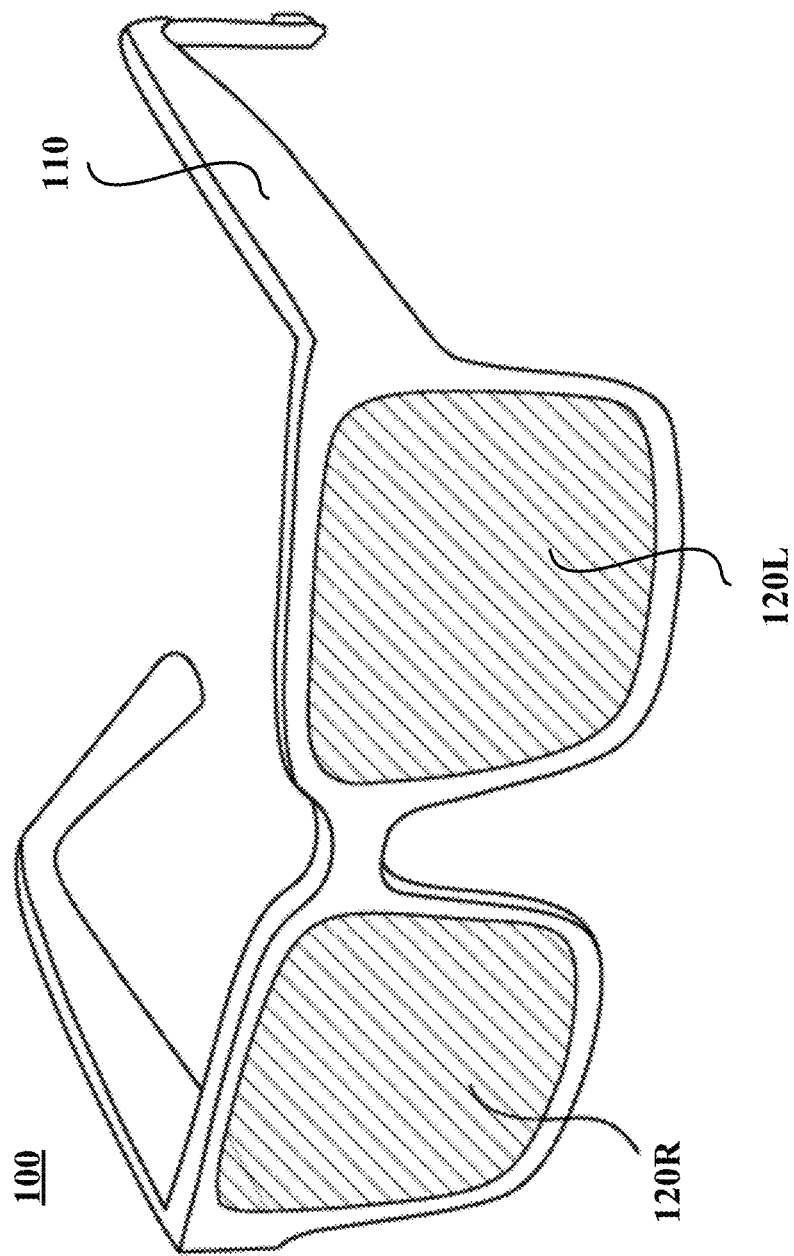
FIG. 1 illustrates a schematic diagram of a near-eye display, according to an embodiment of the present disclosure.

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

As used herein, the terms "couple," "coupled," "coupling," or the like may encompass an optical coupling, a mechanical coupling, an electrical coupling, an electromagnetic coupling, or a combination thereof. An "optical coupling" between two optical elements refers to a configuration in which the two optical elements are arranged in an optical series, and a light output from one optical element may be directly or indirectly received by the other optical element. An optical series refers to optical positioning of a plurality of optical elements in a light path, such that a light output from one optical element may be transmitted, reflected, diffracted, converted, modified, or otherwise processed or manipulated by one or more of other optical elements. In some embodiments, the sequence in which the plurality of optical elements are arranged may or may not affect an overall output of the plurality of optical elements. A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" has a meaning similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. The description may be based on a reference coordinate system shown in a figure, or may be based on a current view or example configuration shown in a figure. For example, when a view shown in a figure is described, the first element may be described as being disposed "on" the second element. It is understood that the term "on" may not necessarily imply that the first element is over the second element in the vertical, gravitational direction. For example, when the assembly of the first element and the second element is turned 180 degrees, the first element may be "under" the second element (or the second element may be "on" the first element). Thus, it is understood that when a figure shows that the first element is "on" the second element, the configuration is merely an illustrative example. The first element may be disposed or arranged at any suitable orientation relative to the second element (e.g., over or above the second element, below or under the second element, left to the second element, right to the second element, behind the second element, in front of the second element, etc.).

The wavelength ranges or bands mentioned in the present disclosure are for illustrative purposes. The disclosed optical device, system, element, assembly, and method may be applied to a visible wavelength range, as well as other wavelength ranges, such as an ultraviolet ("UV") wavelength range, an infrared wavelength range, or a combination thereof.

In the present disclosure, when a grating structure is described as being disposed (e.g., formed, deposited, coated, etched, recorded, or otherwise provided) "on" or "at least partially in" a structure, device, or material (e.g., a base structure), the terms "on" or the phrase "at least partially in" should be broadly construed to encompass various configurations, such as a configuration in which the grating structure is formed on a surface of the structure, device, or material, a configuration in which the grating structure is formed at least partially in or inside the structure, device, or material, a configuration in which the grating structure is recorded, coated, deposited, etched, or printed (or provided in any other suitable manner) on or in the structure, device, or material. In other words, the terms "on" or the phrase "at least partially in" may not strictly limit the positional relationship between the grating structure and the structure, device, or material. When a grating structure is referred to as being formed or provided "at" a structure, device, or material, the term "at" should be broadly construed to encompass various configurations in which the grating structure is formed or provided "at least partially in" or "on" the structure, device, or material, as well as other suitable configurations between the grating structure and the base structure, device, or material.

In a conventional optical combiner, grating structures for in-coupling a light into a waveguide may have a constant grating period and a constant slant angle. As a result, a conventional optical combiner may guide a light of a particular field of view ("FOV") direction, or a light within a limited range of FOV directions, to the user's eyes. Thus, an eye-box associated with a conventional near-eye display having a conventional optical combiner is typically small, which provides little room for the eyes of the user to move around. When the eyes move around, the virtual images displayed on the near-eye display may move out of the eye-box and disappear from the user's view. The present disclosure provides an optical waveguide which may function as an optical combiner. The optical waveguide may include one or more grating structures configured to replicate the FOV in space to create a larger (or enlarged) eye-box, thereby improving the user experience.

A grating is an optical component containing a periodic structure (i.e., a grating structure) configured to diffract a light. In the disclosed embodiments, a period of the grating structure (or a grating period) refers to a distance between two adjacent microstructures (also referred to as grating lines). A slant angle of the grating structure refers to an angle between a grating vector and a normal of an incident (or entrance) surface where the light enters the grating structure. According to the present disclosure, the optical waveguide may include one or more (e.g., a set or a plurality of) in-coupling grating structures configured to couple incident lights corresponding to different FOV angles (or directions) into the optical combiner and propagate the in-coupled lights in the optical waveguide through totally internal reflection. The plurality of in-coupling grating structures may be configured with constant (e.g., the same) or variable grating periods and/or the constant or variable slant angles, such that the incident lights corresponding to different FOV angles (or directions) may be coupled into the optical waveguide and further propagated in the optical waveguide through totally internal reflection.

For example, a first in-coupling grating structure for coupling an incident light corresponding to a first FOV direction into the optical waveguide may have a first grating period and a first slant angle. A second in-coupling grating structure for coupling an incident light corresponding to a second FOV direction into the optical waveguide may have a second grating period and a second slant angle. In some embodiments, the first grating period may be different from the second grating period. In some embodiments, the first grating period may be the same as the second grating period. In some embodiments, the first slant angle may be different from the second slant angle. In some embodiments, the first slant angle may be the same as the second slant angle. Other in-coupling grating structures may be configured to couple incident lights corresponding to other different FOV directions into the optical waveguide, respectively, and propagate the in-coupled lights through totally internal reflection at different angles inside the optical combiner.

The optical waveguide may include a plurality of out-coupling grating structures configured to couple the in-coupled lights, which have been propagated inside the optical combiner through totally internal reflection at different angles, out of the optical combiner toward the eyes of a user. The out-coupling grating structures may include one or more (e.g., a plurality of) sets of out-coupling grating structures one-to-one corresponding to the plurality of in-coupling grating structures. The out-coupling grating structures included in the same set of out-coupling grating structures may have the same grating period and/or the same slant angle. The out-coupling grating structures included in different sets of out-coupling grating structures may have different grating periods and/or different slant angles. In some embodiments, the out-coupling grating structures included in the same set of out-coupling grating structures may have at least two different grating periods and/or at least two different slant angles.

For example, in some embodiments, the plurality of sets of out-coupling grating structures may include a first set of out-coupling grating structures corresponding to the first in-coupling grating structure, and a second set of out-coupling grating structures corresponding to the second in-coupling grating structure. Each of the first set of out-coupling grating structures and the second set of out-coupling grating structures may include one, two, or more than two out-coupling grating structures. In some embodiments, all of the out-coupling grating structures included in the first set of out-coupling grating structures may have the same grating period and the same slant angle. In some embodiments, all of the out-coupling grating structures included in the second set of out-coupling grating structures may have the same grating period and the same slant angle, which may be different from the grating period and slant angle associated with the first set of out-coupling grating structures. In some embodiments, at least two of the out-coupling grating structures included in the first or the second set of out-coupling grating structures may have different grating periods and/or different slant angles.

FIG. 1 illustrates a schematic diagram of an embodiment of a near-eye display ("NED") 100. In some embodiments, certain device(s) or component(s) shown in FIG. 1 may be omitted. In some embodiments, additional device(s) or component(s) not shown in FIG. 1 may be included in the NED 100. The NED 100 may be configured to present media content to a user, such as one or more images, videos, and/or audios. In one embodiment, audios may be presented via an external device (e.g., a speaker and/or a headphone), which may receive audio information from the NED 100 and/or a console and present audio data based on the audio information. The NED 100 may be operated as an augmented reality ("AR") device, a virtual reality ("VR") device, a mixed reality ("MR") device, or some combinations thereof.

As shown in FIG. 1, the NED 100 may include a frame 110, a right display system 120R, and a left display system 120L. The frame 110 may include any suitable type of mounting structures to mount the right display system 120R and the left display system 120L adjacent a user's eyes. The right display system 120R and the left display system 120L may be configured to enable the user to view content presented by the NED 100 and/or to view images of real-world objects (e.g., each of the right display system 120R and the left display system 120L may include a see-through optical element, such as an optical combiner disclosed herein). In some embodiments, the right display system 120R and the left display system 120L may include any suitable display assembly (not shown) configured to generate a virtual image or an image light of the virtual image and to direct the image light to an eye of the user.

Figure 2:
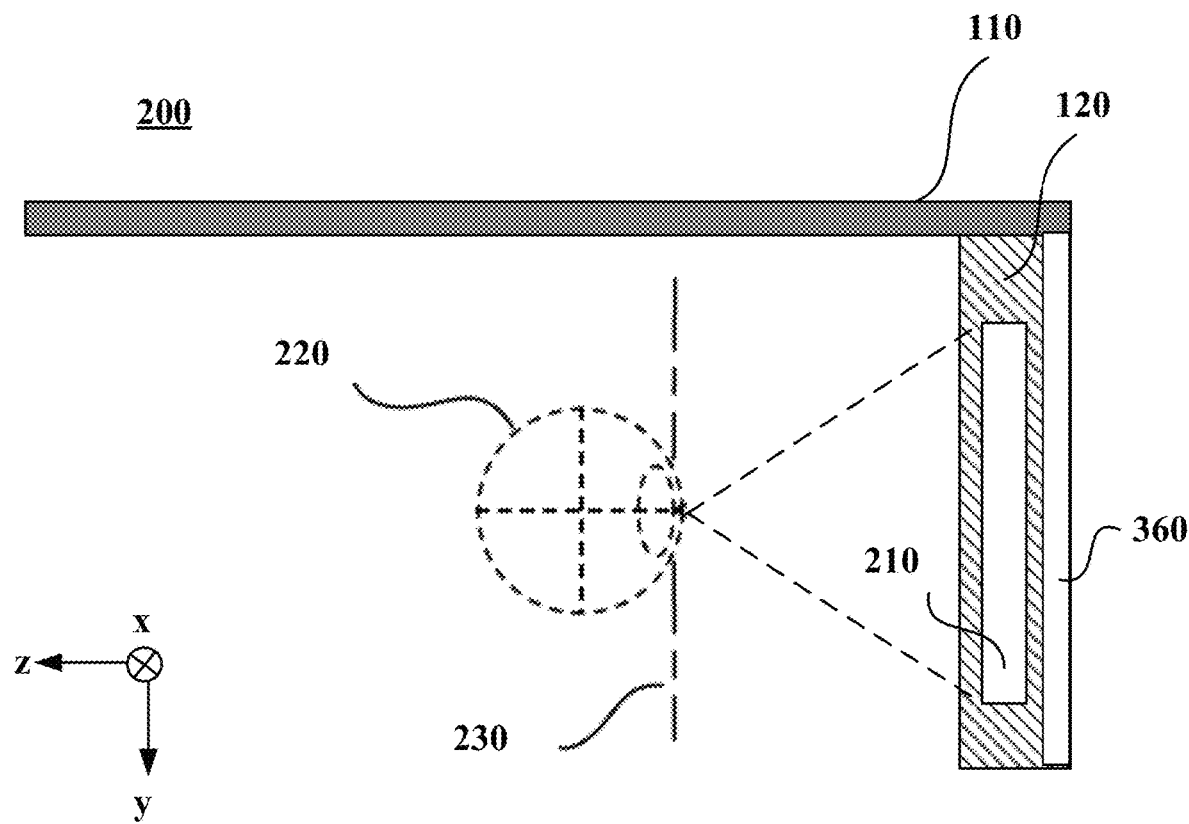
FIG. 2 illustrates a schematic diagram of a cross section of the near-eye display, according to an embodiment of the present disclosure.

FIG. 2 illustrates an embodiment of a cross section 200 of the NED 100 shown in FIG. 1. For purposes of illustration, FIG. 2 shows the cross section 200 associated with the left display system 120L. As shown in FIG. 2, the left display system 120L may include a waveguide display assembly 210 for an eye 220 of the user, and an optical combiner 360 coupled with the display assembly 210. In some embodiments, the waveguide display assembly 210 may be configured to generate an image light, and guide the image light toward the optical combiner 360. The optical combiner 360 may guide the image light toward an eye-box located at an exit pupil 230. The exit pupil 230 may be at a location where the eye 220 of the user is positioned in an eye-box region. For purposes of illustration, FIG. 2 shows the cross section 200 associated with a single eye 220 and a single waveguide display assembly 210. In some embodiments, another display assembly that is separate from the waveguide display assembly 210 shown in FIG. 2, may provide an image light to an eye-box located at an exit pupil of another eye of the user.

The waveguide display assembly 210 may include one or more materials (e.g., a plastic, a glass, etc.) with one or more refractive indices. The waveguide display assembly 210 may effectively minimize the weight and widen the field of view ("FOV") of the NED 100. In some embodiments, the waveguide display assembly 210 may be a component of the NED 100. In some embodiments, the waveguide display assembly 210 may be a component of some other NED, or other system that directs an image light to a particular location. As shown in FIG. 2, the waveguide display assembly 210 may be for one eye 220 of the user. The waveguide display assembly 210 for one eye may be separated or partially separated from the waveguide display assembly 210 for the other eye. In certain embodiments, a single waveguide display assembly 210 may be used for both eyes 220 of the user.

In some embodiments, the NED 100 may include one or more optical elements disposed between the waveguide display assembly 210 and the eye 220. The optical elements may be configured to, e.g., correct aberrations in an image light emitted from the waveguide display assembly 210, magnify an image light emitted from the waveguide display assembly 210, perform another type of optical adjustment of an image light emitted from the waveguide display assembly 210. Examples of the one or more optical elements may include an aperture, a Fresnel lens, a convex lens, a concave lens, a filter, or any other suitable optical element that affects an image light. In some embodiments, the waveguide display assembly 210 may include a stack of waveguide displays. In some embodiments, the stacked waveguide displays may include a polychromatic display (e.g., a red-green-blue ("RGB") display) formed by stacking waveguide displays whose respective monochromatic light sources are of different colors. For example, the stacked waveguide displays may include a polychromatic display that is configured to be projected on multiple planes (e.g., multi-focus colored display). In some embodiments, the stacked waveguide displays may include a monochromatic display configured to be projected on multiple planes (e.g., multi-focus monochromatic display).

In some embodiments, the optical combiner 360 may be at least partially transparent to enable a user of the NED 100 to view real world scenes. The virtual scene displayed by the waveguide display assembly 210 may be optically combined with the view of the real world scene to achieve an optical see-though AR near-eye display. Although two optical combiners 360 are illustrated in the embodiment shown in FIG. 2 (one on each side of the user's eyes), a single optical combiner 360 may be used in some embodiments. FIG. 2 shows that the optical combiner 360 is disposed in parallel with the waveguide display assembly 210. This configuration is for illustrative purposes. The present disclosure does not limit the positional relationship between the waveguide display assembly 210 and the optical combiner 360.

Figure 3:
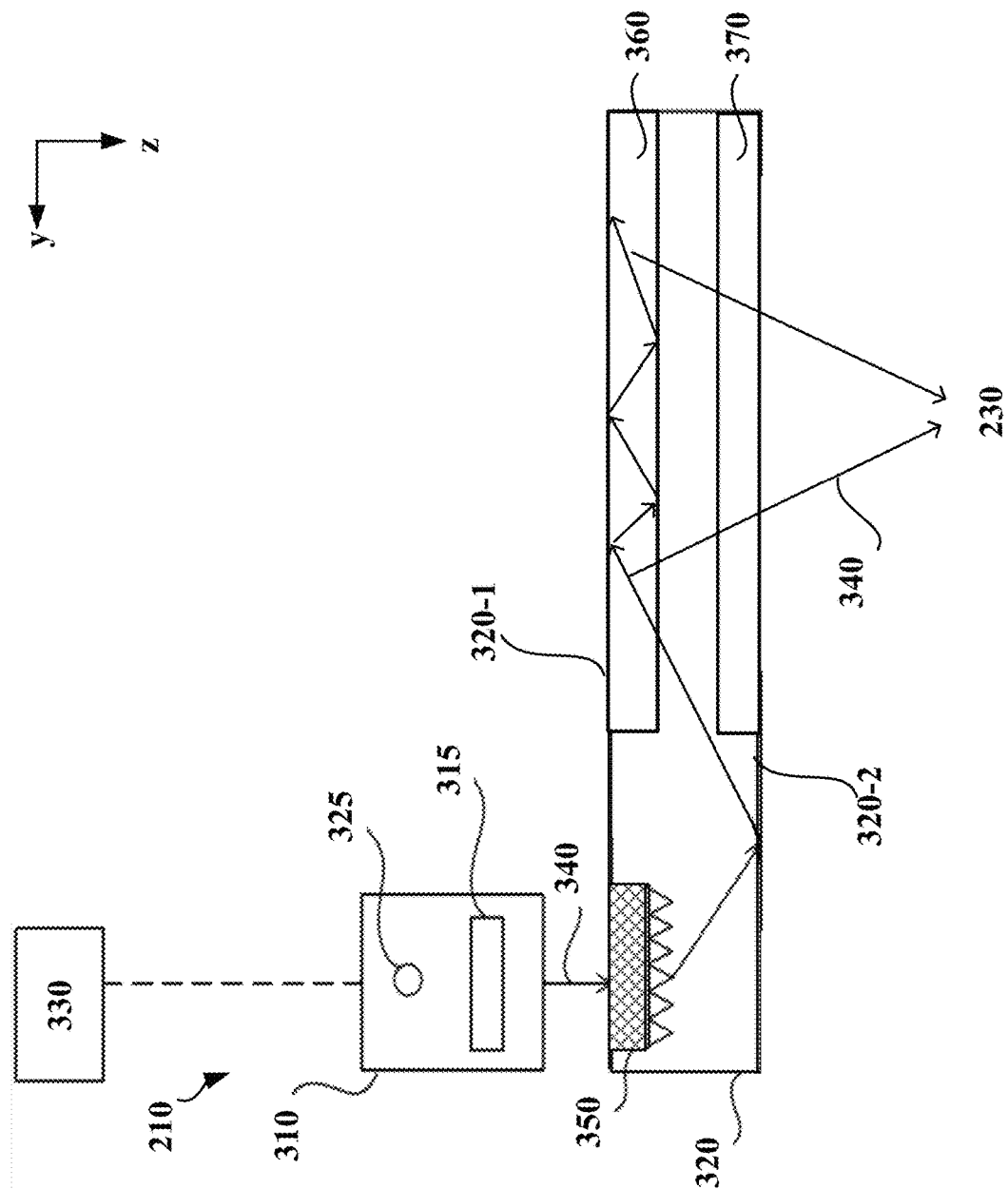
FIG. 3 illustrates a schematic diagram of a waveguide display assembly and an optical combiner, according to an embodiment of the present disclosure.

FIG. 3 illustrates a schematic diagram of an embodiment of a waveguide display assembly 210 and an optical combiner 360. FIG. 3 illustrates a y-z section of the waveguide display assembly 210 and the optical combiner 360. As shown in FIG. 3, the waveguide display assembly 210 may include a light source assembly 310, an output waveguide 320, and a light source controller 330. The light source assembly 310 may include a light source 325 and an optical system 315. The optical system 315 may include one or more optical components configured to condition the light generated by the light source 325. For example, the optical system 315 may be controlled by the light source controller 330 to perform various conditioning (e.g., polarizing, expanding, and/or collimating) on the light generated by the light source 325. The one or more optical components may include one or more lenses, one or more polarizers, one or more mirrors, one or more apertures, one or more gratings, or a combination thereof. A light emitted from the optical system 315 of the light source assembly 310 may be referred to as an image light 340.

The light source controller 330 may control the light source assembly 310 to generate an image light 340, and to output the image light 340 to an in-coupling element 350 located at a first side or surface 320-1 of the output waveguide 320. The in-coupling element 350 may couple the image light 340 from the light source assembly 310 into the output waveguide 320. The in-coupling element 350 may include, for example, a diffraction grating (such as a surface relief grating, a volume hologram, a polarization grating, a polarization volume hologram, a metasurface grating, other suitable types of diffractive elements, or a combination thereof), one or more cascaded reflectors, one or more prismatic surface elements, an array of holographic reflectors, or a combination thereof. In some embodiments, the in-coupling element 350 may include a diffraction grating. A period of the diffraction grating may be configured such that the image light 340 is propagated inside the output waveguide 320 through total internal reflection toward the optical combiner 360.

The output waveguide 320 may guide the received image light 340 to the optical combiner 360 located at the first side 320-1 of the output waveguide 320. In some embodiments, the optical combiner 360 may guide the image light toward an eye-box located at the exit pupil 230. In some embodiments, the optical combiner 360 may direct the image light toward an out-coupling element 370 located at a second side 320-2 of the output waveguide 320, such that the received input image light 340 may be coupled out of the output waveguide 320 via the out-coupling element 370. The out-coupled image light may be directed to an eye-box located at the exit pupil 230 and further into the eye(s) of the user.

In some embodiments, the optical combiner 360 may be disposed (e.g., formed, deposited, provided, etc.) at the first side 320-1 of the output waveguide 320. For example, in some embodiments, the optical combiner 360 may be formed as an integral part of the output waveguide 320. In some embodiments, the optical combiner 360 may be formed at least partially inside the output waveguide 320. In some embodiments, the optical combiner 360 may not be an integral part of the output waveguide 320 and may be disposed (e.g., attached, affixed, formed, etc.) as a separate element on the waveguide 320.

In some embodiments, the optical combiner 360 may be configured with one or more (e.g., a plurality of) grating structures configured to replicate the FOV in space to create a larger or enlarged eye-box as compared to a conventional optical combiner, thereby improving the user experience of the near-eye display. The out-coupling element 370 may be disposed at the second side 320-2 of the output waveguide 320, such that the optical combiner 360 may be arranged opposite to the out-coupling element 370. In some embodiments, the out-coupling element 370 may be formed as an integral part of the output waveguide 370. In some embodiments, the out-coupling element 370 may be formed at least partially inside the output waveguide 320. In some embodiments, the out-coupling element 370 may not be an integral part of the output waveguide 320 and may be disposed (e.g., attached, affixed, formed, etc.) as a separate element on the waveguide 320. In some embodiments, the out-coupling element 370 may include, for example, a diffraction grating (such as a surface relief grating, a volume hologram, a polarization grating, a polarization volume hologram, a metasurface grating, other suitable types of diffractive elements, or a combination thereof), one or more cascaded reflectors, one or more prismatic surface elements, an array of holographic reflectors, or a combination thereof.

In some embodiments, the waveguide display assembly 210 may include a plurality of light source assemblies 310 and a plurality of output waveguides 320. At least one (e.g., each) of the light source assemblies 310 may emit a monochromatic image light of a specific wavelength band corresponding to a primary color (e.g., red, green, or blue). The optical combiner 360 may include a plurality of grating structures configured to replicate the FOV in RGB in space to create a larger or enlarged eye-box as compared to a conventional optical combiner.

In FIG. 3, the optical combiner 360 is shown as being disposed at a first side 320-1 of the output waveguide 320. This configuration is merely for illustrative purposes. The present disclosure does not limit the positional relationship between the output waveguide 320 and the optical combiner 360. In some embodiments, the optical combiner 360 may be disposed side-by-side with the output waveguide 320.

Figure 4:
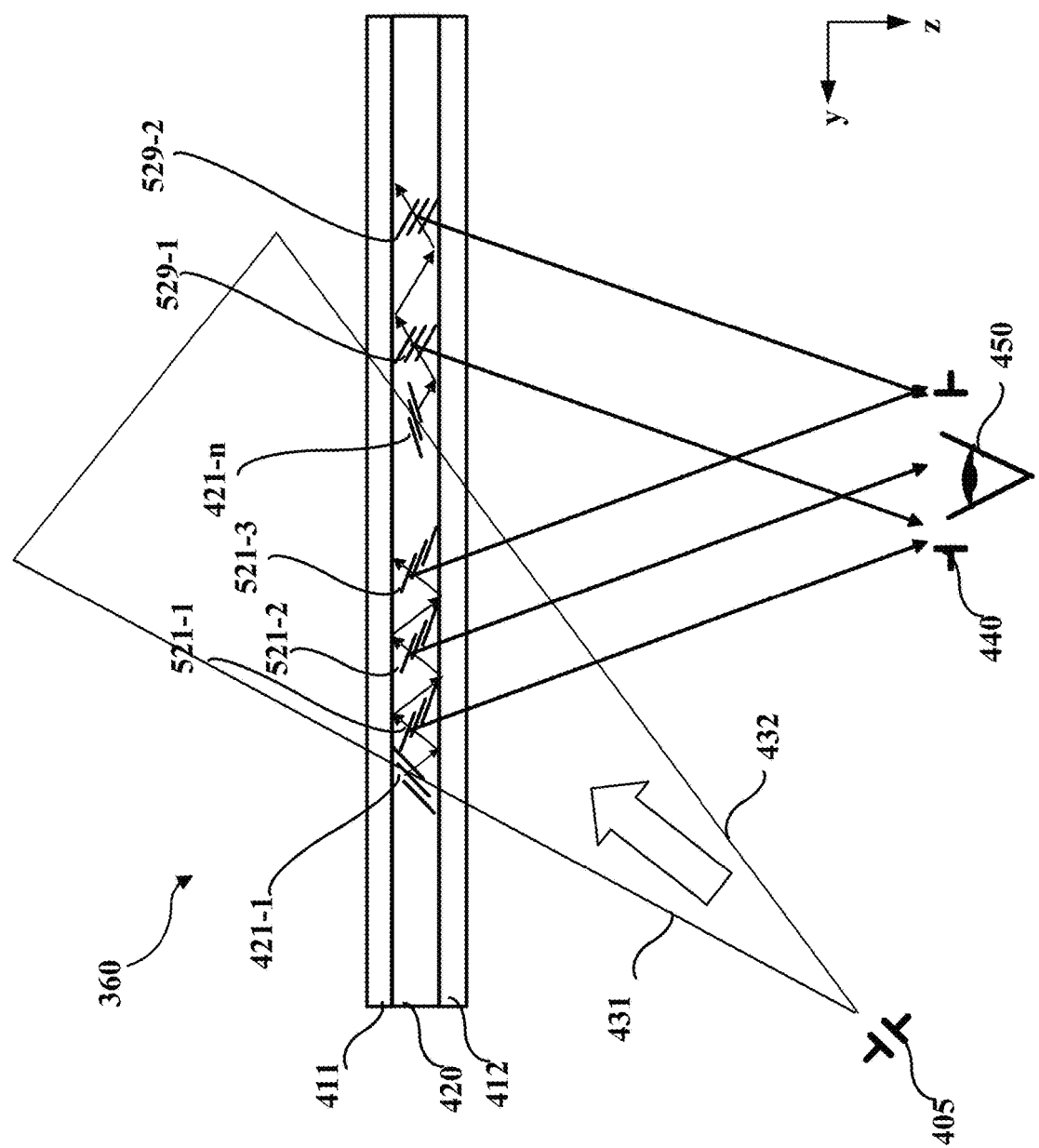
FIG. 4 illustrates a schematic diagram of an optical combiner, according to an embodiment of the present disclosure.
Figure 5A:
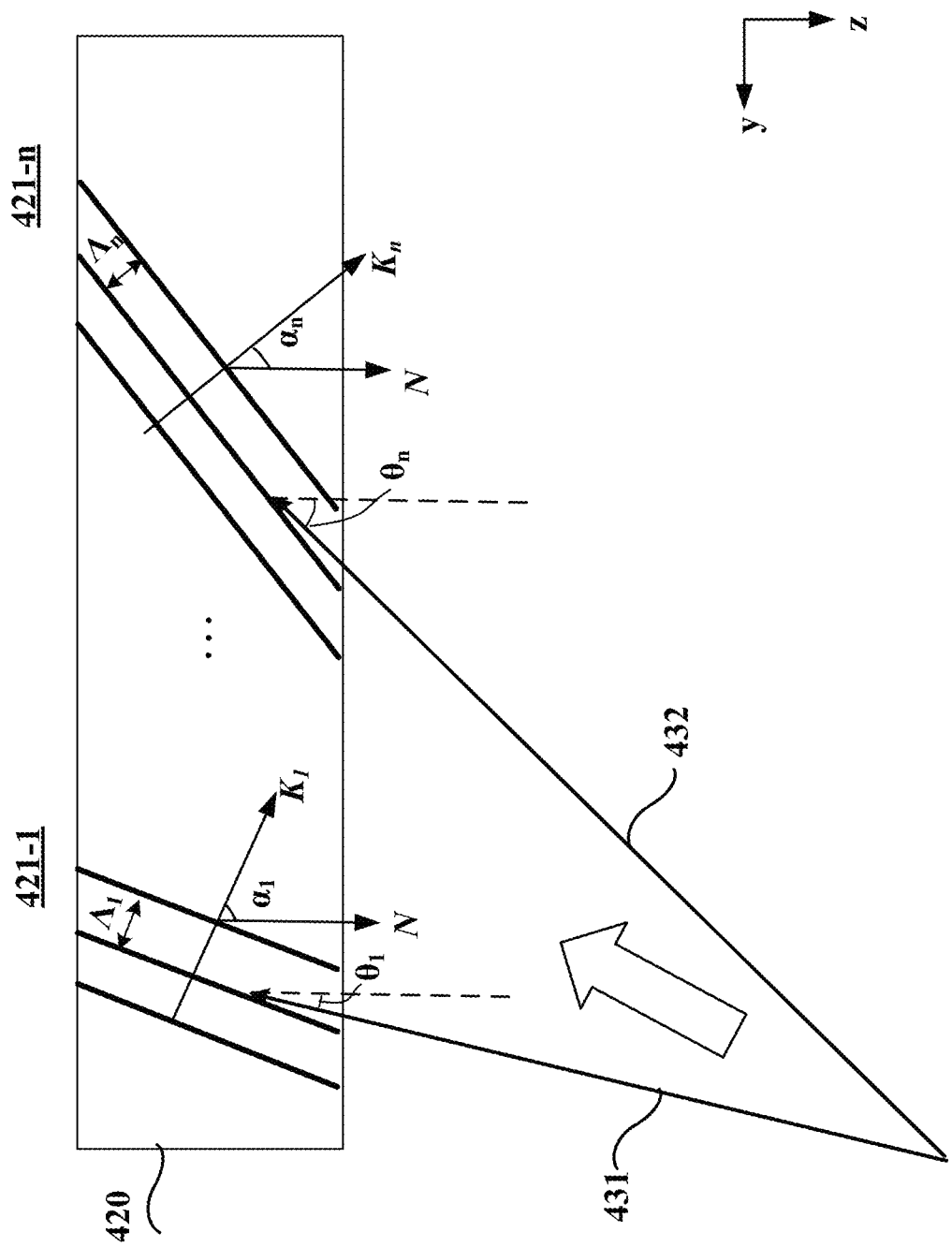
FIG. 5A illustrates a schematic diagram of in-coupling grating structures that may be included in the optical combiner shown in FIG. 4, according to an embodiment of the present disclosure.
Figure 5B:
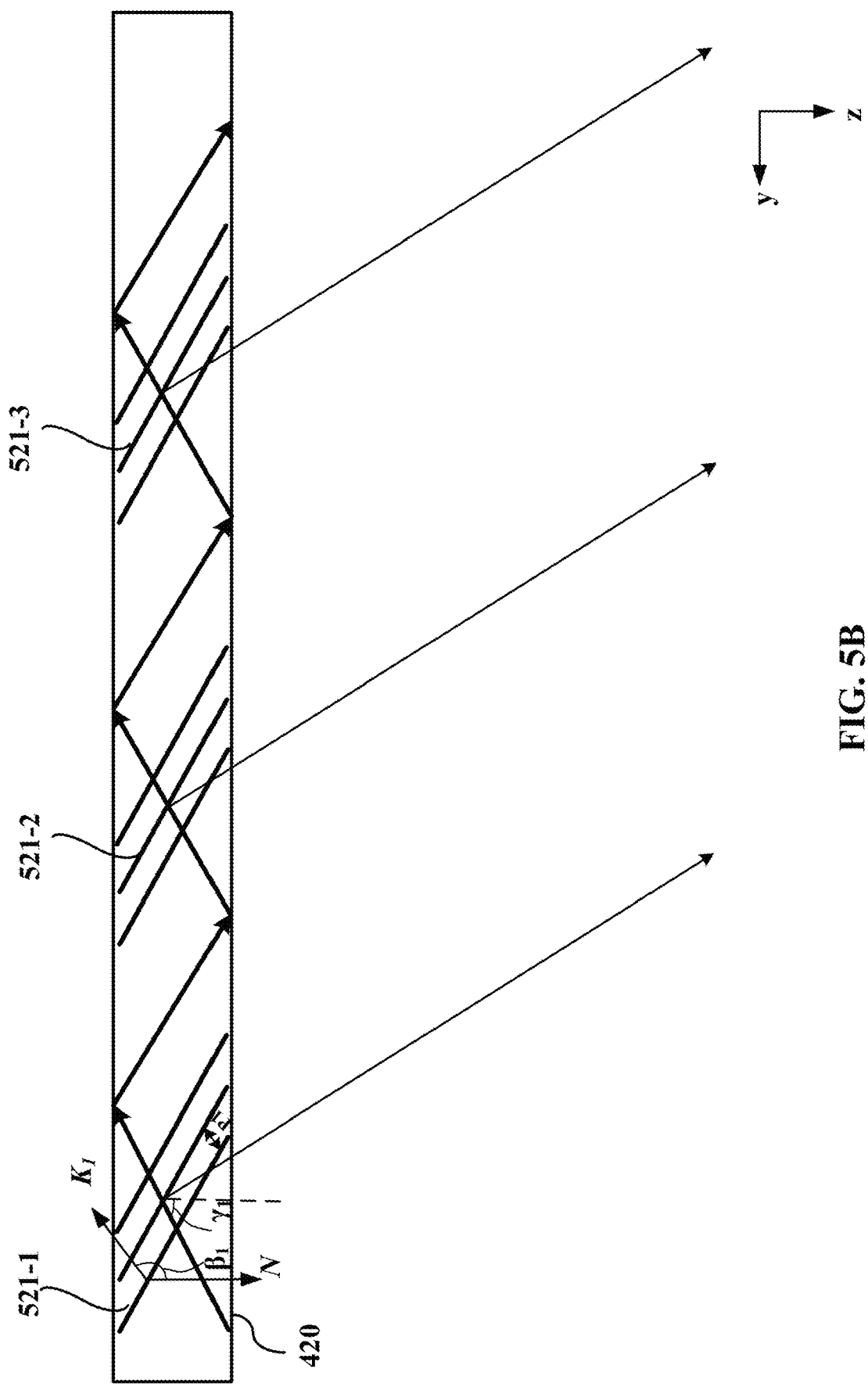
FIG. 5B illustrates a schematic diagram of out-coupling grating structures that may be included in the optical combiner shown in FIG. 4, according to an embodiment of the present disclosure.

FIG. 4 schematically illustrates an embodiment of the optical combiner 360. FIG. 4 illustrates a y-z section of the optical combiner 360. FIG. 5A schematically illustrates an embodiment of the in-coupling grating structures included in the optical combiner 360 shown in FIG. 4. FIG. 5A illustrates a y-z section of the in-coupling grating structures included in the optical combiner 360 shown in FIG. 4. FIG. 5B schematically illustrates an embodiment of the out-coupling grating structures included in the optical combiner 360 shown in FIG. 4. FIG. 5A illustrates a y-z section of the out-coupling grating structures included in the optical combiner 360 shown in FIG. 4.

As shown in FIG. 4, the optical combiner 360 may be configured to guide a light, such as an image light generated by a display assembly 405, toward an eye 450 of a user. Although for illustrative purposes, the display assembly 405 is shown as being separated from the optical combiner 360, in some embodiments, the display assembly 405 may be disposed in parallel or in a stacked configuration with the optical combiner 360. In some embodiments, the display assembly 405 may be similar to, or may be an embodiment of, the waveguide display assembly 210. In some embodiments, the display assembly 405 may include any suitable display device that may be configured to display media content (e.g., images and/or videos). In some embodiments, the display 405 may be replaced by another optical element that is not a display, such as a light source or an optical element configured to direct an image light toward the optical combiner 360.

As shown in FIG. 4, in some embodiments, the optical combiner 360 may include a first substrate 411, a second substrate 412, and a base structure 420 sandwiched between the first substrate 411 and the second substrate 412. In some embodiments, the first substrate 411 and the second substrate 412 may be in direct contact with the opposite surfaces of the base structure 420. In some embodiments, an intermediate element may be disposed between the first substrate 411 and the base structure 420, and/or between the second substrate 412 and the base structure 420. At least one (e.g., each) of the first substrate 411 or the second substrate 412 may be substantially transparent in the optical band of interest (e.g., in a visible wavelength band, in an infrared wavelength band, etc.). In some embodiments, at least one (e.g., each) of the first substrate 411 or the second substrate 412 may be substantially transparent in the visible wavelength band (e.g., a wavelength band from about 380 nm to 750 nm). In some embodiments, at least one (e.g., each) of the first substrate 411 or the second substrate 412 may be substantially transparent in at least some of the infrared ("IR") wavelength band (e.g., in a wavelength band from about 750 nm to about 1 mm). The first substrate 411 and the second substrate 412 may include a suitable material, such as a silicon, a silicon dioxide, a sapphire, a plastic, a glass, or a combination thereof.

The base structure 420 may include a suitable material. One or more grating structures, for example, volume holographic grating structures, surface relief grating structures, may be disposed (e.g., formed) at the base structure 420 (e.g., on or at a surface of the base structure 420, or at least partially inside the base structure 420). The material may include at least one of a photosensitive (or photoresist) material (e.g., a photopolymer), a silicon, a plastic, a glass, or a combination thereof. In the following descriptions, photopolymer may be used as an example of the material of the base structure 420. In some embodiments, a plurality of grating structures (e.g., volume holographic grating structures, surface relief grating structures, etc.) may be formed (e.g., deposited, recorded) on a surface of the photopolymer base structure 420 or at least partially in the photopolymer base structure 420 through a suitable process, such as holography, lithography, electron beam processing, electron irradiation, or a combination thereof. In some embodiments, the photopolymer included in the base structure 420 may have a predetermined thickness and a large birefringence to record multiplexed holograms with high diffraction efficiency and small angular bandwidth.

For illustrative purposes, example grating structures 421-1, 521-1, 521-2, 521-3, 421-n, 529-1, and 529-2 are schematically shown as being formed at least partially in the base structure 420. In some embodiments, the grating structures may be formed at other portions of the base structure 420, such as at a top surface and/or a bottom surface of the base structure 420 (e.g., at the two opposite surfaces where the first substrate 411 and the second substrate 412 are disposed).

A grating structure may be a periodic structure including a plurality of microstructures (also referred to as grating lines). For illustrative purposes, three grating lines are schematically shown in each of the grating structures 421-1, 521-1, 521-2, 521-3, 421-n, 529-1, and 529-2. The number of grating lines is not limited to three, and can be any suitable numbers, such as less than three and more than three. In some embodiments, the grating structures may include at least 100 grating lines. In some embodiments, the grating structures may include at least 1000 grating lines. The number of the grating lines in a grating structure may vary, and may be configured based on various application scenarios.

The grating structure may be associated with a grating period and a slant angle. Referring to FIG. 5A, in the disclosed embodiments, a period of the grating structure (or a grating period) $\Lambda$ refers to a distance between two adjacent grating lines, and a slant angle $\alpha$ of the grating refers to an angle between a grating vector K and a normal N of the incident surface.

In some embodiments, the grating period $\Lambda$ may be on the order of the wavelength of the incident light. In some embodiments, the slant angle $\alpha$ may be defined between 0 to 90 degrees. In some embodiments, the slant angle $\alpha$ may be defined between 0 to 180 degrees.

Returning to FIG. 4, reference numbers 431 and 432 represent the image lights corresponding to the leftmost and rightmost FOV directions, respectively. In some embodiments, through configuring the grating structures, the optical combiner 360 may be configured to replicate the entire FOV related to the image lights generated by the display assembly 405, thereby achieving a larger or enlarged eye-box 440 for an eye 450 of a user, as compared to a conventional optical combiner. In some embodiments, through configuring the grating periods and slant angles of the grating structures, the image light corresponding to each of a plurality of FOV directions between the leftmost image light 431 and the rightmost image light 432 may be coupled into the optical combiner 360, propagated through total internal reflection inside the optical combiner 360, and coupled out of the optical combiner 360. Thus, the grating structures may guide the image lights corresponding to different FOV directions to the eye 450, thereby replicating a virtual image at different spatial locations to increase the size of the eye-box 400.

Compared to a conventional optical combiner that may guide only an image light corresponding to a particular FOV direction or some FOV directions to the eye 450, the disclosed optical combiner 360 may direct image lights corresponding to substantially the entire FOV to the eye 450, thereby replicating the entire FOV to provide a larger or enlarged eye-box 440 as compared to a conventional optical combiner. The larger eye-box 440 provides a larger viewing space for the eye, such that when the eye moves around, the eye would not lose sight of the image displayed on the display.

In some embodiments, the optical combiner 360 may include one or more (e.g., a plurality of) first grating structures 421-1, 421-2, 421-3, ..., 421-n (for simplicity, only 421-1 and 421-n are shown, with "n" being a positive integer number). The plurality of first grating structures may also be referred to as in-coupling grating structures. The in-coupling grating structures 421-1 to 421-n may be configured to couple the image lights corresponding to different FOV directions associated with the display assembly 405 into the optical combiner 360. For example, the in-coupling grating structure 421-1 may be configured to couple the image light 431 corresponding to the leftmost FOV direction into the optical combiner 360, and the in-coupling grating structure 421-n may be configured to couple the image light 432 corresponding to the rightmost FOV direction into the optical combiner 360. Each of the in-coupling grating structures 421-1, ..., 421-i, ..., 421-n may be associated with a grating period $\Lambda_i$ and a slant angle $\alpha_i$, where i is a positive integer $1 \leq i \leq n$, as shown in FIG. 5A (for simplicity, only $\Lambda_1$, $\Lambda_n$ and $\alpha_1$, $\alpha_n$ are shown).

FIG. 5A illustrates a diagram of an embodiment of in-coupling grating structures that may be included in the optical combiner 360. As shown in FIG. 5A, the grating period $\Lambda$ of the in-coupling grating structures 421-1 to 421-n may be variable, and/or the slant angle $\alpha$ of the in-coupling grating structures 421-1 to 421-n may be variable. For example, the first in-coupling grating structure 421-1 may be associated with a grating period $\Lambda_1$ and a first slant angle $\alpha_1$ for diffracting the leftmost light 431, the second in-coupling grating structure 421-2 may be associated with a grating period $\Lambda_2$ and a second slant angle $\alpha_2$, and so on, the last in-coupling grating structure 421-n may be associated with a grating period $\Lambda_n$ and a slant angle $\alpha_n$ for diffracting the rightmost light 432.

In some embodiments, the grating periods $\Lambda_1, \Lambda_2, \ldots, \Lambda_n$ may all be the same. In some embodiments, at least two of the grating periods $\Lambda_1, \Lambda_2, \ldots, \Lambda_n$ may be different. In some embodiments, all of the grating periods $\Lambda_1, \Lambda_2, \ldots, \Lambda_n$ may be different from one another. In some embodiments, the slant angles $\alpha_1, \alpha_2, \ldots, \alpha_n$ may all be the same. In some embodiments, at least two of the slant angles $\alpha_1, \alpha_2, \ldots, \alpha_n$ may be different. In some embodiments, all of the slant angles $\alpha_1, \alpha_2, \ldots, \alpha_n$ may be different from one another. In some embodiments, both of the grating period $\Lambda_i$ and the slant angle $\alpha_i$ may be different for at least two of the in-coupling grating structures. For example, in some embodiments, all of the grating periods $\Lambda_i$ and the slant angles $\alpha_i$ may be different for all of the in-coupling grating structures, where i is a positive integer and $1 \leq i \leq n$.

In some embodiments, the grating period $\Lambda_i$ and the slant angle $\alpha_i$ of the i-th in-coupling grating structure 421-i may be configured to enable the i-th in-coupling grating structure 421-i to couple the image lights of different incident angles into the optical combiner 360 through Bragg diffraction, where the image lights of different incident angles may correspond to different FOV directions. For the image light incident at an angle $\theta_i$, the Bragg diffraction occurs when the Bragg condition, $\lambda = 2n_{eff} \Lambda_i \cos(\theta_i + \alpha_i)$, is satisfied. In this equation, $\lambda$ is the diffracted wavelength (e.g., the wavelength of the image light), $n_{eff}$ is the effective refractive index of the grating layer including air and photopolymer, $\theta_i$ is the angle between the image light incident onto the i-th in-coupling grating structure 421-i and the normal N of the incident photopolymer surface, $\Lambda_i$ is the grating period and $\alpha_i$ is the slant angle of the i-th in-coupling grating structure 421-i. In some embodiments, the grating periods $\Lambda_1, \Lambda_2, \ldots, \Lambda_n$ may gradually increase or decrease. In some embodiments, the slant angles $\alpha_1, \alpha_2, \ldots, \alpha_n$ may gradually increase or decrease. With the gradually varying grating periods and slant angles, the image lights generated by the display assembly 405 corresponding to various FOV directions (or corresponding to different portions of the FOV) may be coupled into the optical combiner 360, then propagated through total internal reflection inside the optical combiner 360.

Referring back to FIG. 4, the optical combiner 360 may include a plurality of second grating structures or out-coupling grating structures configured to couple the image lights out of the optical combiner 360 toward the eye-box 440. For an image light that is coupled into the optical combiner 360 by an in-coupling grating structure (e.g., 421-1), there may be one or more (e.g., a set of) out-coupling grating structures (e.g., 521-1, 521-2, 521-3) for coupling the image light out of the optical combiner 360 at different portions of the optical combiner and/or at different slant angles, thereby enlarging the size of the eye-box 440.

The number of the out-coupling grating structures included in the set for out-coupling a particular image light may depend on the out-coupling efficiency of the out-coupling grating structure. The number may be one, two, or more than two. The term "a set" may include any suitable number, such as one, two, or more than two. Likewise, for each in-coupling grating structure, 421-2, 421-3, ..., 421-n, there may be one or more (e.g., a set of) corresponding out-coupling grating structures configured to couple the image light out of the optical combiner 360. That is, in some embodiments, the i-th set of out-coupling grating structures may correspond to the i-th in-coupling grating structure. For illustrative purposes, FIG. 4 shows a set of three out-coupling grating structures 521-1, 521-2, and 521-3 for out-coupling the image light 431 that is in-coupled by the in-coupling grating structure 421-1, and a set of two out-coupling grating structures 529-1 and 529-2 for out-coupling the image light 432 that is in-coupled by the in-coupling grating structure 421-n.

For the set of out-coupling grating structures corresponding to an in-coupling grating structure, the grating periods and the slant angles of the out-coupling grating structures within the set may be constant. That is, the out-coupling grating structures within the set may have the same grating period and the same slant angle. In other words, the i-th set of out-coupling grating structures may correspond to the i-th in-coupling grating structure, and the grating structures in the i-th set of out-coupling grating structures may have the same grating period $P_i$ and the same slant angle $\beta_i$, as shown in FIG. 5B. FIG. 5B illustrates a diagram of an embodiment of out-coupling grating structures that may be included in the optical combiner 360. For simplicity, only the out-coupling grating structures 521-1 to 521-3, and $P_1$ and $\beta_1$ of the out-coupling grating structure 521-1 are shown.

Referring to FIG. 4 and FIG. 5B, in some embodiments, for the first set of out-coupling grating structures 521-1, 521-2, and 521-3 corresponding to the first in-coupling grating structure 421-1, the grating periods of the out-coupling grating structures 521-1, 521-2, and 521-3 may be constant (or the same) and the slant angles of the out-coupling grating structures 521-1, 521-2, and 521-3 may be constant (or the same).

In some embodiments, the grating periods for different sets of out-coupling grating structures corresponding to different in-coupling grating structures may be different. For example, grating periods for at least two sets of out-coupling grating structures may be different. In some embodiments, the slant angles for different sets of out-coupling grating structures corresponding to different in-coupling grating structures may be different. For example, slant angles for at least two sets of out-coupling grating structures corresponding to different in-coupling grating structures may be different.

In some embodiments, for a set of out-coupling grating structures corresponding to an in-coupling grating structure, the grating periods and the slant angles of the out-coupling grating structures within the set may be configured, such that the set of out-coupling grating structures may couple the image light, which is in-coupled by the corresponding in-coupling grating structure, out of the optical combiner through Bragg diffraction. That is, the grating period $P_i$ and the slant angle $\beta_i$ of the i-th set of out-coupling grating structures corresponding to the i-th in-coupling grating structure may be configured to enable the i-th set of out-coupling grating structures to couple the image light, which is in-coupled by the i-th in-coupling grating structure 421-$i$, out of the optical combiner 360 through Bragg diffraction.

For the image light incident on an out-coupling grating structure at an angle $\beta_i$, the Bragg diffraction occurs when Bragg condition, $\lambda = 2n_{eff} P_i \cos(\gamma_i + \beta_i)$, is satisfied. In this equation, $\lambda$ is the diffracted wavelength (e.g., the wavelength of the image light), $n_{eff}$ is the effective refractive index of the grating layer including air and photopolymer, $\gamma_i$ is the angle between the image light incident onto the i-th set of out-coupling grating structures and the normal N of the incident photopolymer surface, $P_i$ is the grating period, and $\beta_i$ is the slant angle of the grating structures in the i-th set of out-coupling grating structures. Thus, the image light, which corresponds to an FOV direction and which is coupled into the optical combiner 360 by the in-coupling grating structure, may be coupled out of the optical combiner 360 by the corresponding set of out-coupling grating structures. As a result, a virtual image may be replicated at different spatial locations. That is, a multitude of pupils may be recreated in space. Accordingly, a larger eye-box 440 may be created (or the eye-box 440 may be enlarged) as compared to a conventional optical combiner, and the user experience may be enhanced.

In the disclosed embodiments, through configuring a plurality of in-coupling and out-coupling volume Bragg grating structures in the base structure (e.g., volume holographic Bragg grating structures in the photopolymer base structure), the display-generated image lights, which corresponds to various FOV directions or various portions of the FOV, may be coupled into the optical combiner by the in-coupling volume Bragg grating structure via Bragg diffraction and propagated through total internal reflection inside the optical combiner, then coupled out of the optical combiner by the corresponding set of out-coupling volume Bragg grating structures via Bragg diffraction. Thus, a virtual image may be replicated at different spatial locations. That is, a multitude of pupils may be recreated in space. Accordingly, a larger (or enlarged) eye-box may be created by the disclosed optical combiner when compared to a conventional optical combiner. The user may have more freedom or space to move eyes around and the displayed virtual image may not move out of the eye-box and disappear from the user's view. The disclosed optical system may significantly enhance the user experience.

Figure 6:
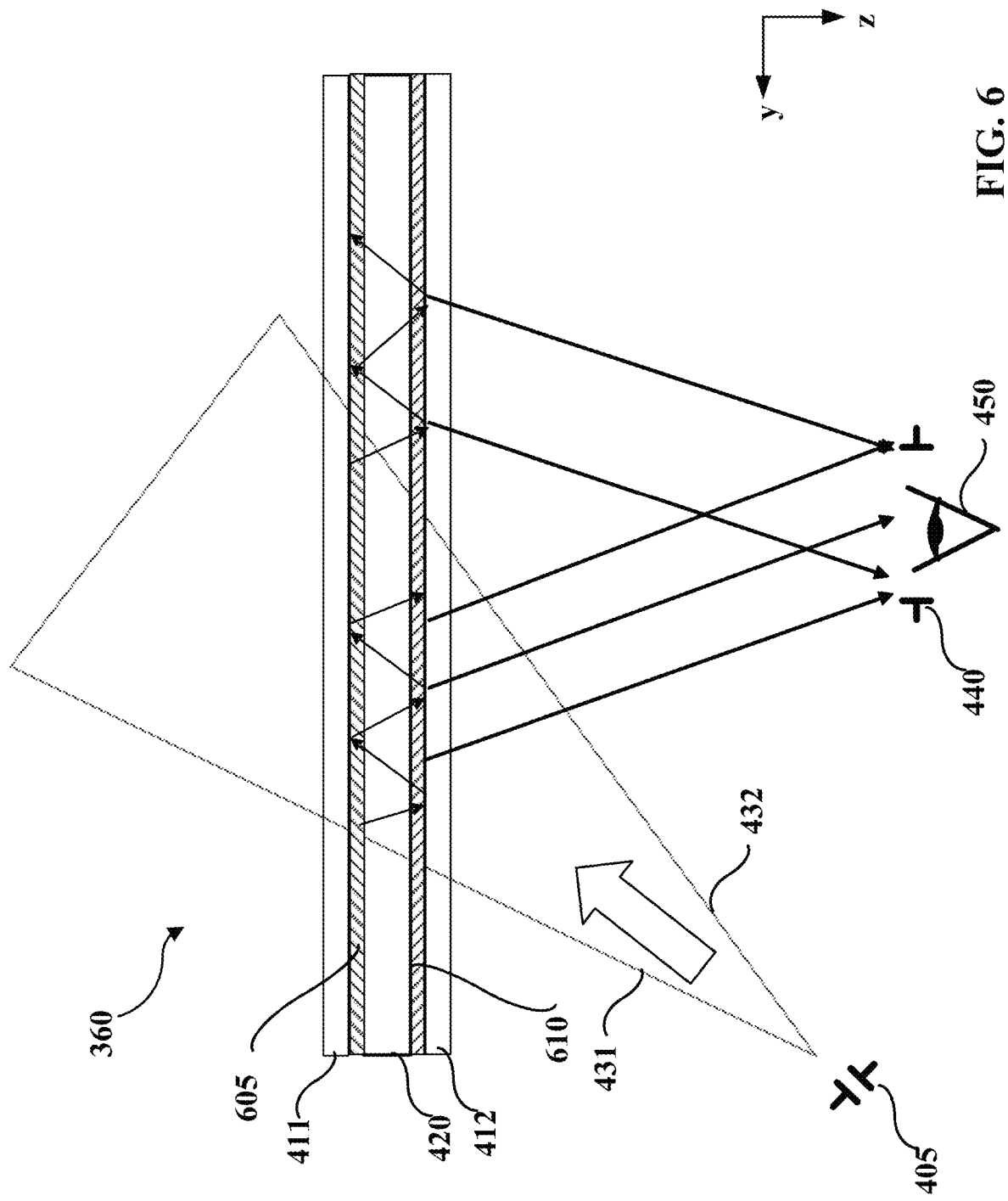
FIG. 6 illustrates a schematic diagram of an optical combiner, according to another embodiment of the present disclosure.

FIG. 6 schematically illustrates another embodiment of the optical combiner 360. The embodiment shown in FIG. 6 may include elements that are similar to or the same as those included in the embodiment shown in FIG. 4. Descriptions of the same or similar elements can refer to the descriptions rendered above in connection with FIG. 4. FIG. 6 illustrates a y-z section of the optical combiner 360. As shown in FIG. 6, the optical combiner 360 may include a plurality of grating structures disposed (e.g., formed) at other locations of the optical combiner 360. In some embodiments, the grating structures may include surface relief gratings.

As shown in FIG. 6, the base structure 420 may have a top surface facing the first substrate 411 and an opposing bottom surface. The first substrate 411 may have a bottom surface facing the base structure 420 and an opposing top surface. The second substrate 412 may have a top surface facing the base structure 420 and an opposing bottom surface. In some embodiments, a plurality of grating structures 605 (e.g., surface relief grating structures) may be disposed (e.g., formed) at the top surface of the base structure 420 or at the bottom surface of the first substrate 411. In some embodiments, a plurality of grating structures 610 (e.g., surface relief grating structures) may be disposed (e.g., formed) at the bottom surface of the base structure 420 or at the top surface of the second substrate 412. In some embodiments, the grating structures 605 and/or 610 may be formed as integral parts of the base structure 420. In some embodiments, the grating structures 605 and/or 610 may be separately formed at the top and/or bottom surfaces of the base structure 420.

In some embodiments, the grating structures 605 may be disposed (e.g., formed) at least partially in (or inside) the first substrate 411. In some embodiments, the grating structures 605 shown in FIG. 6 may be formed as integral parts of the first substrate 411. In some embodiments, the grating structures 605 may be formed at least partially in any suitable portion(s) of the first substrate 411. In some embodiments, the grating structures 610 may be formed at least partially in (or inside) the second substrate 412. In some embodiments, the grating structures 610 shown in FIG. 6 may be formed as integral parts of the second substrate 412. In some embodiments, the grating structures 610 may be formed at least partially in any suitable portions of the second substrate 412.

The grating structures may be disposed (e.g., formed) at other suitable locations, such as, for example, at the top surface of the first substrate 411, and/or at the bottom surface of the second substrate 412. For example, the grating structures 605 may be disposed (e.g., formed) at the top surface of the first substrate 411. In some embodiments, the grating structures 610 may be disposed (e.g., formed) at the bottom surface of the second substrate 412.

In some embodiments, the grating structures for in-coupling the image lights and the grating structures for out-coupling the image lights included in the embodiment shown in FIG. 6 may have properties similar to those of the corresponding grating structures included in other embodiments, such as those shown in FIG. 4. For example, the in-coupling grating structures may have a variable grating period and/or a variable slant angle. In some embodiments, the in-coupling grating structures may have a constant grating period and/or a constant slant angle. In a set of out-coupling grating structures (e.g., having two or more out-coupling grating structures) corresponding to an in-coupling grating structure, the grating periods may be constant (or the same) for the out-coupling grating structures, and the slant angles may be constant (or the same) for the out-coupling grating structures. In some embodiments, the in-coupling grating structures and the out-coupling grating structures may both be provided in the grating structures 605. In some embodiments, the grating structures 610 may include both in-coupling grating structures and out-coupling grating structures. In some embodiments, the grating structures 605 may include only in-coupling grating structures and the grating structures 610 may include only out-coupling grating structures. In some embodiments, the grating structures 605 may include only out-coupling grating structures and the grating structures 610 may include only in-coupling grating structures.

Figure 7:
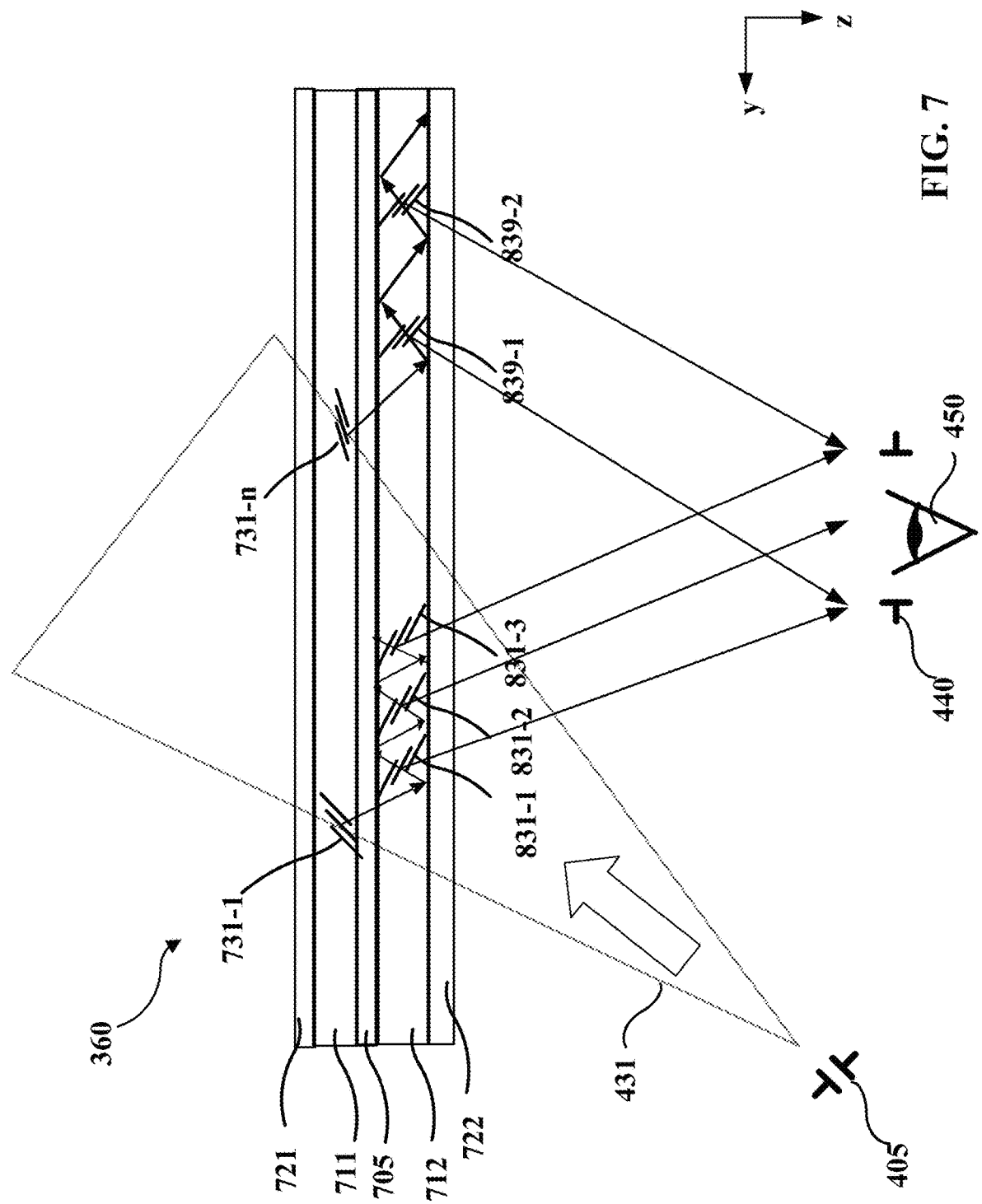
FIG. 7 illustrates a schematic diagram of an optical combiner, according to another embodiment of the present disclosure.

FIG. 7 schematically illustrates another embodiment of the optical combiner 360. The embodiment shown in FIG. 6 may include elements that are similar to or the same as those included in the embodiment shown in FIG. 4. Descriptions of the same or similar elements can refer to the descriptions rendered above in connection with FIG. 4. FIG. 7 illustrates a y-z section of the optical combiner 360. As shown in FIG. 7, the optical combiner 360 may include a plurality of grating layers, for example, a plurality of photopolymer layers each including a plurality of grating structures. Although two grating layers are shown in FIG. 7 for illustrative purposes, in some embodiments, more than two grating layers may be included in the optical combiner 360.

As shown in FIG. 7, the optical combiner 360 may include a top substrate 721, a center substrate 705, a bottom substrate 722, a first base structure (e.g., a first photopolymer layer) 711 sandwiched between the top substrate 721 and center substrate 705, and a second base structure (e.g., a second photopolymer layer) 712 sandwiched between the center substrate 705 and the bottom substrate 722. The center substrate 705, the top substrate 721, and the bottom substrate 722 may be similar to the substrates 411 and 412 shown in FIG. 4.

In some embodiments, each grating layer may include either the in-coupling grating structures or the out-coupling grating structures. In one embodiment, as shown in FIG. 7, a plurality of in-coupling grating structures 731-1, 731-2, 731-3, . . . , 731-n may be disposed (e.g., formed) at the first base structure 711. A plurality of out-coupling grating structures 831-1, 831-2, 831-3, . . . , 839-1, 839-2 may be disposed (e.g., formed) at the second base structure 712. In other embodiments, the first base structure 711 may include the out-coupling grating structures 831-1, 831-2, 831-3, . . . , 839-1, 839-2, and the second base structure 712 may include the in-coupling grating structures 731-1, 731-2, 731-3, . . . , 731-n.

The in-coupling grating structures and the out-coupling grating structures may have properties similar to those described above in connection with other embodiments, such as those described above in connection with the embodiment shown in FIG. 4. For example, the in-coupling grating structures may have a variable grating period and/or a variable slant angle. In some embodiments, the in-coupling grating structures may have a constant grating period and/or a constant slant angle. In some embodiments, in a set of out-coupling grating structures (e.g., out-coupling grating structures 831-1, 831-2, 831-3) corresponding to an in-coupling grating structure (e.g., in-coupling grating structure 731-1), the grating periods may be constant (or the same) for the out-coupling grating structures, and the slant angles may be constant (or the same) for the out-coupling grating structures. In some embodiments, in a set of out-coupling grating structures (e.g., out-coupling grating structures 831-1, 831-2, 831-3) corresponding to an in-coupling grating structure (e.g., in-coupling grating structure 731-1), at least two grating periods may be different (e.g., variable) for at least two of the out-coupling grating structures, and at least two slant angles may be different (e.g., variable) for at least two of the out-coupling grating structures. In some embodiments, a grating layer (e.g., the first base structure 711 and/or second base structure 712) may include a mixture of both in-coupling grating structures and out-coupling grating structures.

Embodiments of the disclosure may include or be implemented in conjunction with an artificial reality system. Artificial reality may include a virtual reality ("VR"), an augmented reality ("AR"), a mixed reality ("MR"), or a combination thereof. Artificial reality content may include generated content or generated content combined with captured (e.g., real world) content. The artificial reality content may include video data, audio data, haptic feedback, or a combination thereof. The artificial reality content may be presented in a single channel or in multiple channels (such as a stereo video that produces a three-dimensional effect to the viewer).

In some embodiments, artificial reality may also be associated with applications, products, accessories, services, or a combination thereof, which may be used to, e.g., create content in an artificial reality and/or otherwise used in (e.g., performing activities in) an artificial reality. The artificial reality system that provides the artificial reality content may be implemented in various platforms, including a head-mounted display ("HMD") connected to a host computer system, a standalone HMD, a mobile device or computing system, or any other hardware platform capable of providing artificial reality content to one or more viewers.

The foregoing description of the embodiments of the disclosure has been presented for the purpose of illustration. It is not intended to be exhaustive or to limit the disclosure to the precise forms disclosed. Persons skilled in the relevant art can appreciate that many modifications and variations are possible in light of the above disclosure.

Various embodiments have been described to illustrate the exemplary implementations. Based on the disclosed embodiments, a person having ordinary skills in the art may make various other changes, modifications, rearrangements, and substitutions without departing from the scope of the present disclosure. Thus, while the present disclosure has been described in detail with reference to the above embodiments, the present disclosure is not limited to the above described embodiments. The present disclosure may be embodied in other equivalent forms without departing from the scope of the present disclosure. The scope of the present disclosure is defined in the appended claims.

What is claimed is:

1. An optical combiner, comprising:
 a first substrate and a second substrate;
 a base structure disposed between the first substrate and the second substrate; and
 a plurality of grating structures disposed at the base structure and comprising:
  a plurality of in-coupling grating structures configured to couple a plurality of lights into the optical combiner, wherein at least one of a grating period or a slant angle of a first in-coupling grating structure is different from at least one of a corresponding grating period or a corresponding slant angle of a second in-coupling grating structure; and a plurality of out-coupling grating structures configured to couple the lights out of the base structure along a longitudinal direction of the base structure, wherein spatial distribution of the in-coupling grating structures along the longitudinal direction of the base structure overlaps with spatial distribution of the out-coupling grating structures along the longitudinal direction of the base structure.

2. The optical combiner of claim 1, wherein:

for at least one of the in-coupling grating structures that couples a light into the base structure, a set of two or more out-coupling grating structures are configured to couple the light out of the base structure, and the two or more out-coupling grating structures have at least one of a same grating period or a same slant angle.

3. The optical combiner of claim 1, wherein the base structure comprises a photopolymer material.

4. The optical combiner of claim 3, wherein the plurality of grating structures comprise a plurality of volume holographic grating structures recorded in the photopolymer material.

5. The optical combiner of claim 1, wherein the plurality of grating structures comprise at least one of a volume holographic grating structure or a surface relief grating structure.

6. The optical combiner of claim 1, wherein grating periods of at least two of the plurality of in-coupling grating structures are different.

7. The optical combiner of claim 1, wherein slant angles of at least two of the plurality of in-coupling grating structures are different.

8. The optical combiner of claim 1, wherein the grating structures are disposed at at least one of a top surface or a bottom surface of the base structure.

9. The optical combiner of claim 1, wherein at least a portion of the plurality of grating structures is provided at at least one of a surface of the first substrate facing the base structure, a surface of the first substrate facing against the base structure, a surface of the second substrate facing the base structure, or a surface of the second substrate facing against the base structure.

10. The optical combiner of claim 1, wherein at least a portion of the plurality of grating structures is provided at least partially inside at least one of the first substrate or the second substrate.

11. The optical combiner of claim 1, wherein the base structure comprises a first base structure and a second base structure, the plurality of in-coupling grating structures are provided at the first base structure, and the plurality of out-coupling grating structures are provided at the second base structure.

12. The optical combiner of claim 11, further comprising:

a center substrate, wherein the first base structure is disposed between the first substrate and the center substrate, and wherein the second base structure is disposed between the center substrate and the second substrate.

13. An optical device, comprising:

a display configured to generate a plurality of image lights; and an optical combiner coupled with the display and configured to guide the image lights generated by the display to an eye-box of the optical device, the optical combiner comprising:

a first substrate and a second substrate;

a base structure disposed between the first substrate and the second substrate; and a plurality of grating structures disposed at the base structure and comprising:

a plurality of in-coupling grating structures configured to couple the image lights into the optical combiner, wherein at least one of a grating period or a slant angle of a first in-coupling grating structure is different from at least one of a corresponding grating period or a corresponding slant angle of a second in-coupling grating structure; and a plurality of out-coupling grating structures configured to couple the image lights out of the base structure along a longitudinal direction of the base structure, wherein spatial distribution of the in-coupling grating structures along the longitudinal direction of the base structure overlaps with spatial distribution of the out-coupling grating structures along the longitudinal direction of the base structure.

14. The optical device of claim 13, wherein:

for at least one of the in-coupling grating structures that couples an image light into the base structure, a set of two or more out-coupling grating structures are configured to couple the image light out of the base structure, and the two or more out-coupling grating structures have at least one of a same grating period or a same slant angle.

15. The optical device of claim 13, wherein the base structure comprises a photopolymer material, and the plurality of grating structures comprise a plurality of volume holographic grating structures recorded in the photopolymer material.

16. The optical device of claim 13, wherein the plurality of grating structures comprise at least one of a volume holographic grating structure or a surface relief grating structure.

17. The optical device of claim 13, wherein grating periods of at least two of the plurality of in-coupling grating structures are different, or slant angles of at least two of the plurality of in-coupling grating structures are different.

18. The optical device of claim 13, wherein the base structure comprises a first base structure and a second base structure, the plurality of in-coupling grating structures are provided at the first base structure, and the plurality of out-coupling grating structures are provided at the second base structure.

19. The optical device of claim 18, further comprising:

a center substrate, wherein the first base structure is disposed between the first substrate and the center substrate, and wherein the second base structure is disposed between the center substrate and the second substrate.

* * * * *